M. TRUHAN.
FLUID HEATER FOR LAMPS.
APPLICATION FILED MAR. 10, 1917.

1,240,389.

Patented Sept. 18, 1917.

Inventor
M. Truhan
By
N. M. Wilson
Attorney

UNITED STATES PATENT OFFICE.

MIKE TRUHAN, OF BRIDGER, MONTANA.

FLUID-HEATER FOR LAMPS.

1,240,389.　　　　　　　Specification of Letters Patent.　　Patented Sept. 18, 1917.

Application filed March 10, 1917.　Serial No. 153,864.

*To all whom it may concern:*

Be it known that I, MIKE TRUHAN, a citizen of the United States by naturalization, residing at Bridger, in the county of Carbon and State of Montana, have invented certain new and useful Improvements in Fluid-Heaters for Lamps, of which the following is a specification.

This invention relates to certain new and useful improvements in fluid heaters for lamps.

The primary object of this invention is the provision of a ready attachment for burners such as lamp burners whereby a small quantity of liquid such as tea, coffee, or milk may be easily and quickly heated.

A further object of the device is the provision of a liquid heater adapted for positioning upon a burner after the manner of the usual lamp chimney, the attachment being arranged so as not to interfere with the operation of the burner, a controlling extinguishing means, however, being provided therefor.

A still further object of the device is the provision of a heater attachment for lamps that is easy and inexpensive to manufacture and by means of which beverages may be readily heated.

With these general objects in view and others that will appear as the nature of the invention is better understood, the same consists in the novel construction, combination and arrangement of parts hereinafter fully described, illustrated in the accompanying drawing and pointed out in the appended claim.

In the drawing forming a part of this application and in which like numerals refer to corresponding parts throughout the several views, Figure 1 is an elevational view of a lamp provided with the present device, parts being broken away.

Figure 1:
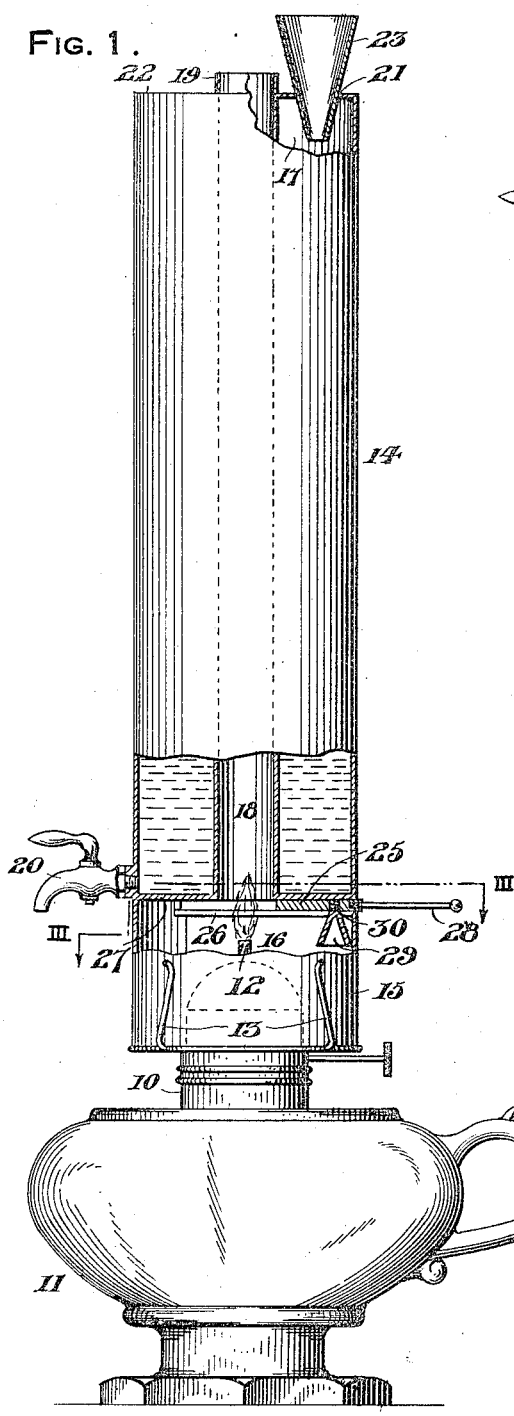
Figure 2:
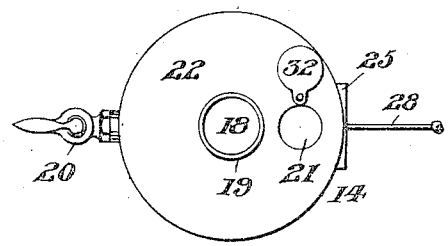
Fig. 2 is a top plan view of the device detached and with the filling funnel removed.
Figure 3:
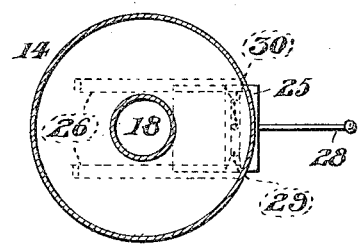
Fig. 3 is a transverse sectional view taken upon line III—III of Fig. 1.

The present device being designed for heating liquid may be employed with any form of burner but is advantageously arranged for use upon the burner 10 of a lamp 11 provided with the usual vertical adjustable burner wick 12 and the resilient retaining wires 13 adapted for removably securing a chimney upon the burner.

The device broadly consists of a cylindrical drum 14 having the lower end portion 15 thereof open at its end with a chamber 16 having the wick 12 arranged therein and positioned upon the burner 10 taking the place of the chimney for the lamp. An annular fluid chamber 17 is provided in the drum 14, an axially arranged tube or flue pipe being provided for alinement with the wick 12 affording an outlet for the products of combustion, the said flue having a slight extension 19 at the upper end of the drum. An outlet faucet 20 is provided at the lower end of the chamber 17 and a filling opening 21 is provided in the top 22 of the drum 14 adapted for the removable reception of a funnel 23.

Figure 4:
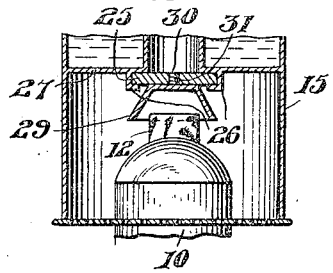
Fig. 4 is a central vertical sectional view through a portion of the device with the extinguisher member in its operative arrangement with respect to the burner, and, Fig. 5 illustrates in perspective the controlling damper and the extinguisher adapted for association therewith.
Figure 5:
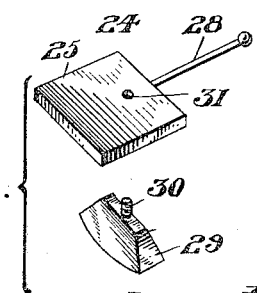

A controlling damper 24 is arranged for the wick 12 being formed of a rectangular slide plate 25 shiftably arranged within opposite guides 26 upon the bottom 27 of the drum chamber 17 and adapted for movement transversely of the lower end of the flue 18 by means of an outwardly projecting handle 28. An inverted cup-shaped extinguisher 29 for the wick 12 is removably attached to the plate 25 being in the nature of a snuffer and having a threaded stud 30 for engagement within the opening 31 of the said plate. By this arrangement it will be seen that the plate 25 may be shifted inwardly for altering the size of the opening in the lower end of the flue and controlling the draft for the blaze from the wick 12 while the slide may be readily positioned for arranging the snuffer 29 directly over the wick as illustrated in Fig. 4 of the drawing thereby extinguishing the same when found desirable.

It will be readily understood that the device may readily replace the lamp chimney when desired to heat a small quantity of liquid such as coffee or milk, the liquid being readily placed in the chamber 17 through the opening 21 and withdrawn therefrom when heated by means of the faucet 20, a pivoted cover 32 being arranged for the entrance opening 21 adapted to be closed when the funnel 23 is removed therefrom.

What I claim as new is:—

A lamp-heater including a drum-form of container having a liquid or water chamber, said container having in continuation thereof, below the bottom of its water-chamber, a separate bottomless compartment forming a heat-receiving chamber, said bottomless compartment being adapted to be positioned upon a lamp, around the burner, said drum-form of container having a central axial stack-like heating tube, with its lower end opening through the bottom of said water chamber, and its upper end terminating a slight distance above the upper end of said container, said end of the container being provided with a filling opening, said burner-forming chamber having arranged therein a slidable flame-controllable damper, at the entrance of said heating tube, said damper being provided with a snuffer-forming member arranged with respect to the wick-tube of the burner.

In testimony whereof I affix my signature.

MIKE TRUHAN.

Copies of this patent may be obtained for five cents each, by addressing the "Commissioner of Patents, Washington, D. C."